(12) United States Patent
Savaresi et al.

(10) Patent No.: US 10,246,099 B2
(45) Date of Patent: Apr. 2, 2019

(54) SYSTEM FOR THE ESTIMATION OF ONE OR MORE PARAMETERS RELATED TO THE LOAD OF A VEHICLE, PARTICULARLY OF THE ABSOLUTE VALUE AND THE DISTRIBUTION THEREOF

(71) Applicant: E-NOVIA S.R.L., Milan (IT)

(72) Inventors: Sergio Matteo Savaresi, Cremona (IT); Stefano Bottelli, Varese (IT); Mara Tanelli, Lodi (IT); Ivo Boniolo, Bovisio Masciago (IT)

(73) Assignee: E-NOVIA S.R.L., Milan (IT)

( * ) Notice: Subject to any disclaimer, the term of this patent is extended or adjusted under 35 U.S.C. 154(b) by 255 days.

(21) Appl. No.: 14/890,596

(22) PCT Filed: May 14, 2014

(86) PCT No.: PCT/IB2014/061418
§ 371 (c)(1),
(2) Date: Nov. 12, 2015

(87) PCT Pub. No.: WO2014/184747
PCT Pub. Date: Nov. 20, 2014

(65) Prior Publication Data
US 2016/0114809 A1    Apr. 28, 2016

(30) Foreign Application Priority Data
May 16, 2013 (IT) .............................. MI2013A0802

(51) Int. Cl.
*B60W 40/13* (2012.01)
*G01G 19/08* (2006.01)
*G01L 5/16* (2006.01)

(52) U.S. Cl.
CPC ........... *B60W 40/13* (2013.01); *G01G 19/086* (2013.01); *G01L 5/16* (2013.01); *B60W 2530/00* (2013.01)

(58) Field of Classification Search
None
See application file for complete search history.

(56) References Cited

U.S. PATENT DOCUMENTS

| 2007/0017727 A1 | 1/2007 | Messih et al. |
| 2009/0235724 A1 | 9/2009 | Ryu et al. |

(Continued)

FOREIGN PATENT DOCUMENTS

| EP | 2090874 | 8/2009 |
| EP | 2502759 | 9/2012 |

OTHER PUBLICATIONS

Matthew Huang, Vehicle Crash Mechanics, © 2002 by CRC Press LL, 489 pages.*

(Continued)

*Primary Examiner* — Tung S Lau
(74) *Attorney, Agent, or Firm* — Manelli Selter PLLC; Edward J. Stemberger (57) ABSTRACT

The object of the present invention is a system (1) for the estimation of one or more parameters (L, D) related to the load of a vehicle. The system comprises: —one or more sensors for detecting one or more kinematic quantities of the vehicle (I) suitable to generate signals representing said vehicle kinematic quantities; —one or more modules (2) for determining one or more frequency spectra pairs (FFT1, FFT2), each pair associated to one of said one or more vehicle kinematic quantities (I), from the signal representing the respective vehicle kinematic quantity filtered in a first and in a second predetermined frequency bands; —One or more modules (7) for determining said one or more param- (Continued)

eters (L, D) related to the load of the vehicle, from said one or more frequency spectra pairs (FFT1,FFT2).

8 Claims, 12 Drawing Sheets

(56) References Cited

U.S. PATENT DOCUMENTS

2012/0316767 A1* 12/2012 Savaresi ............... B60W 40/09
    701/123
2017/0137023 A1* 5/2017 Anderson .......... B60G 17/0195

OTHER PUBLICATIONS

International Search Report and Written Opinion in PCT/IB2014/061418 dated Oct. 1, 2014.

* cited by examiner

SYSTEM FOR THE ESTIMATION OF ONE OR MORE PARAMETERS RELATED TO THE LOAD OF A VEHICLE, PARTICULARLY OF THE ABSOLUTE VALUE AND THE DISTRIBUTION THEREOF

TECHNICAL FIELD OF THE INVENTION

The object of the present invention is a system for the estimation of one or more parameters related to a vehicle load, in particular for the estimation of the load numeric absolute value and its distribution in the vehicle.

PRIOR ART

The actual load of a vehicle and its distribution in it are parameters, whose determination often proves crucial for a proper use of the vehicle itself.

Typical examples of vehicles subjected to highly variable loads, in terms both of absolute value and of distribution, are vans or trash compactors. In both cases, it is common that, during use, the vehicle is considerably loaded and loads are concentrated in particular areas of the same. It may therefore happen that the vehicle is overly stressed in some areas, with the risk of localized breakages due to overload.

It is therefore necessary to know the actual load of a vehicle and its distribution during use. In addition, an excessively asymmetric load distribution may affect the vehicle stability, with consequent risks of accidents for the users.

Different systems are known for the estimation of the parameters related to the load of a vehicle.

A first type of known system uses non-inertial sensors, such as scales and strain gauges, properly applied to the vehicle.

A second type of system determines the load analyzing longitudinal dynamics, using the well-known Newton's law (Force=Mass×Acceleration). From the measurement or estimation of the acceleration and of all forces acting on the vehicle, its mass can be determined.

Finally, a third type of system determines the load and its distribution, based on the analysis of the vehicle vertical dynamics, in particular obtaining the vehicle vertical acceleration from the vertical acceleration of the wheels or from the road profile, assumed known.

SUMMARY OF THE INVENTION

The object of the present invention is to make available a system, alternative to known systems, for the estimation of one or more parameters related to the load of a vehicle, in particular capable of estimating such parameters, using a simple and moderate-priced instrumentation.

This and other objects are achieved through a system for the estimation of one or more parameters related to the load of a vehicle according to claim 1.

BRIEF DESCRIPTION OF THE FIGURES

To better understand the invention and to appreciate its advantages, some of its non-limiting exemplary embodiments will be described below, referring to the attached figures, wherein.

DETAILED DESCRIPTION OF THE INVENTION

Figure 1:
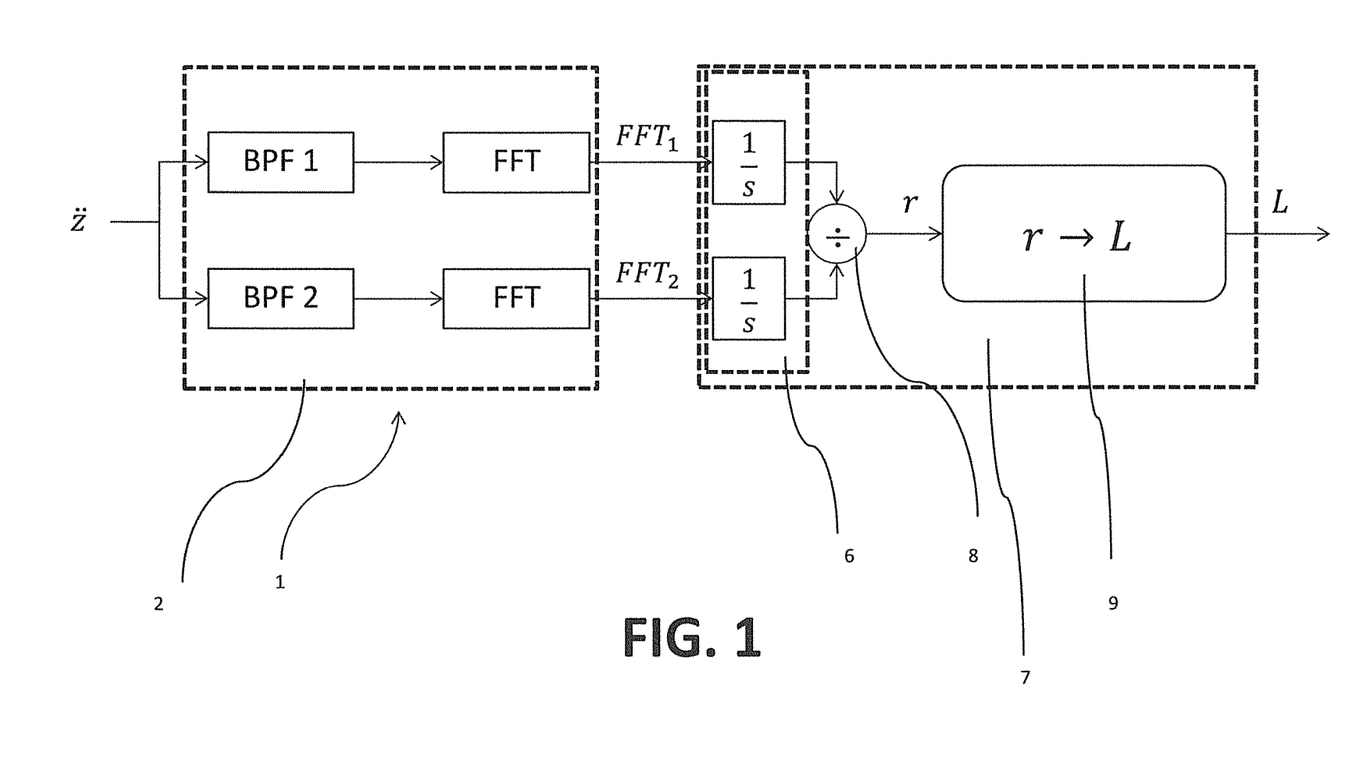
FIG. 1 is a block diagram of a system for the estimation of one or more parameters related to the load of a vehicle according to a possible embodiment.

With reference to FIG. 1, it represents a block diagram of a system 1 for the estimation of a parameter, related to the vehicle load according to a possible embodiment of the invention. System 1 can be installed on any sort of vehicle (not shown in the figures), such as, for example, a car, a motorcycle, a trash compactor, a van. System 1 can be installed on the vehicle in any position.

The parameters related to the load which can be estimated through the system 1 are different: in particular, advantageously, system 1 is capable of estimating the numeric absolute value of the vehicle load L (which can be understood as the vehicle total load or as the differential load compared to a conventional reference condition, where the vehicle is supposed to be unloaded—such value expressed in kilograms) and its distribution in the vehicle itself. The load distribution in the vehicle can be indicated as a numeric value D, which may indicate a conventional longitudinal distance of the point, where the forces, generated by the load from a predetermined reference point, converge. For example, the numeric value D can represent the longitudinal distance of the loaded vehicle barycenter from the vehicle barycenter position in the conventional condition of unloaded vehicle. System 1 is then able to determine the numeric absolute value of the vehicle load L, or the numeric value of the conventional distance of the load D with respect to a reference point, or both. In the block diagram in FIG. 1, system 1 is represented in a configuration suitable to just determine the numeric absolute value of the load L. Hereinafter it will be described how the system is modified in order to determine the conventional distance D or both parameters.

With reference to the embodiment in FIG. 1, system 1 comprises a sensor (not shown in the figures) for detecting the vehicle vertical acceleration, named ž. The term "vertical acceleration" here means the acceleration along the vehicle yaw axis. It should be noted that the vehicle vertical acceleration depends on the location, where the acceleration sensor is positioned. Preferably, the acceleration sensor is positioned in points subjected to high acceleration. The acceleration sensor may, for example, comprise an accelerometer. The acceleration sensor is suitable to generate an output signal, representing the detected vehicle vertical acceleration ž. Advantageously, the acceleration sensor is positioned in the vehicle body.

System 1 comprises a module 2 for determining the frequency spectrum of the vehicle vertical acceleration ž. The spectrum can, for example, be determined through an algorithm for the computation of the Fast Fourier Transform FFT of the signal representing the vehicle vertical acceleration ž. Module 2 for the determination of the frequency spectrum of the vehicle vertical acceleration ž, is specially configured so to determine a frequency spectra pair of the vehicle vertical acceleration ž, and, in particular, of the vertical acceleration filtered respectively in a first and in a second predetermined frequency bands. To this purpose, advantageously, module 2 for the determination of the frequency spectrum of the vehicle vertical acceleration ž comprises a first BPF1 and a second BPF2 band-pass filters, for filtering the signal representing the vertical acceleration ž in the first and in the second predetermined frequency bands.

Figure 2:
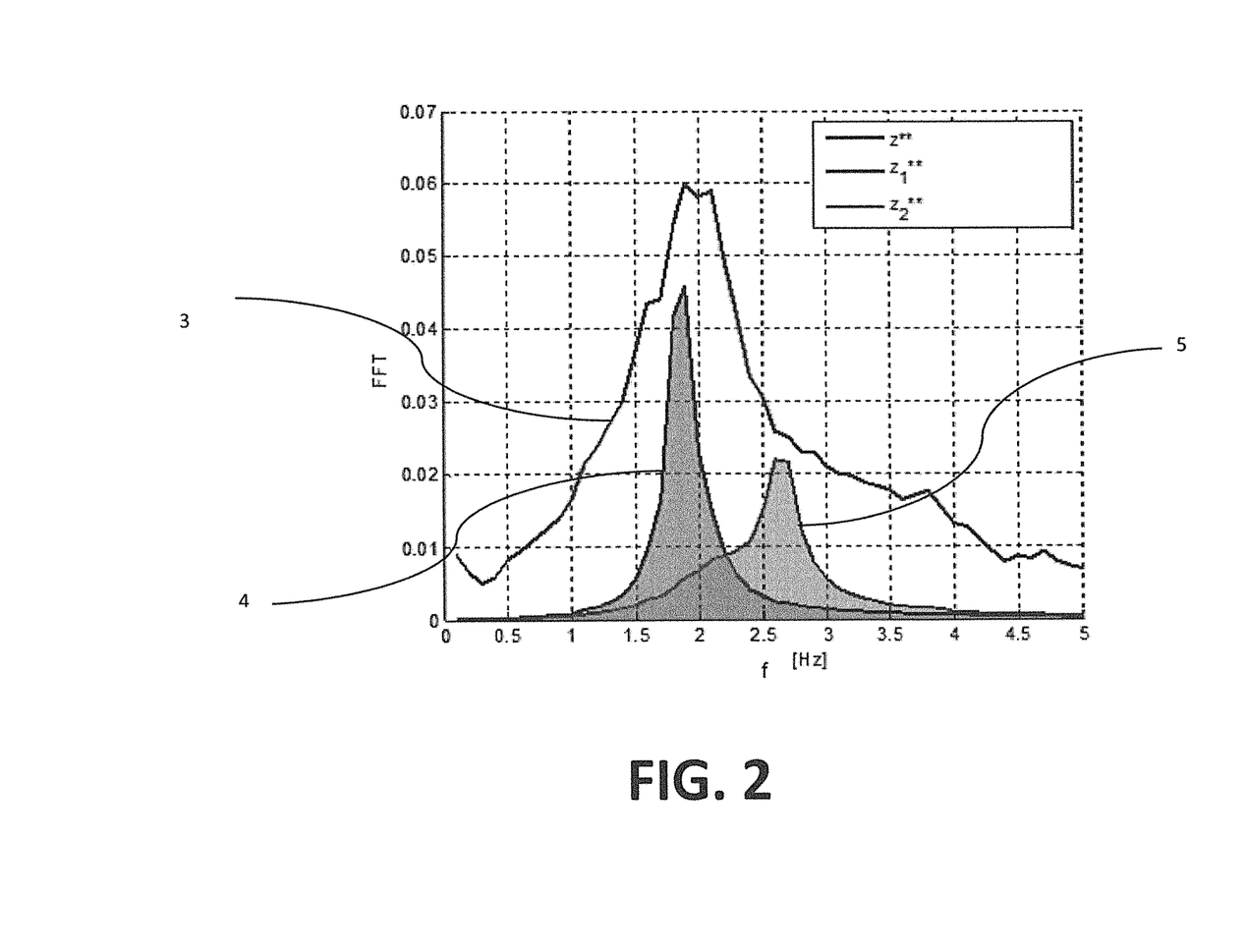
FIG. 2 is a diagram representative of the possible spectrum of a vehicle kinematic quantity, in particular of the vertical acceleration of its body, and of the spectra of the same quantity, filtered in a first and in a second frequency bands.

With reference to FIG. 2, curve 3 represents a possible frequency spectrum of the vehicle vertical acceleration ž, not filtered, while curves 4,5 represent the frequency spectra of the vertical acceleration filtered respectively in the first and second predetermined frequency bands. In the block diagram of FIG. 1, the frequency spectra of the vertical acceleration, filtered respectively in the first and second predetermined frequency bands, are respectively named FFT1 and FFT2 and are determined by FFT blocks, calculating the Fast Fourier Transform of the module 2 for the estimation of the vertical acceleration ž frequency spectrum. Hereafter the selection criteria for the first and the second predetermined frequency bands will be described.

System 1 also comprises a module 7 for determining the parameters related to the vehicle load, with reference to the specific example of the numeric absolute value of the load L, starting from the frequency spectra FFT1, FFT2, previously defined.

Advantageously, module 7 for determining the parameters related to the vehicle load comprises an integrator module 6. In FIG. 1, such module 6 is represented as comprising blocks capable of obtaining the transfer function 1/s, which represents the unitary integrator in the frequency domain on the basis of the Laplace transform. The integrator module 6 acts on the frequency spectra FFT1, FFT2 of the vertical acceleration filtered in the two predetermined frequency bands and makes their integration, i.e. it calculates the area subtended by the curve of the respective spectrum FFT1 or FFT2 (i.e. the areas subtended by the curves 4 and 5 in FIG. 2). The results of the integration of the two spectra FFT1, FFT2 are two numeric values, one for each frequency spectrum of the pair.

With further advantage, module 7 for determining the parameters related to the load of the vehicle comprises a division module 8, configured so as to make a division between the two integrals, calculated through the integrator module 6, of the frequency spectra FFT1, FFT2. The result of such division is a numeric ratio index r, which is in turn associated to the numeric absolute value of the load L via a predetermined relation, whose determination will be described hereafter.

The determination of the numeric absolute value of the vehicle load L can be performed through a comparator module 9, comprised in the module 7 for determining the parameters related to the vehicle load L. The comparator module 9 is indeed configured so to carry out a comparison between the ratio index r, determined by the division module 8, and vehicle load numeric absolute value L, corresponding to such ratio index r on the basis of a predetermined relation, which, determined a priori, can be stored in the comparator module 9 itself.

Figure 3:
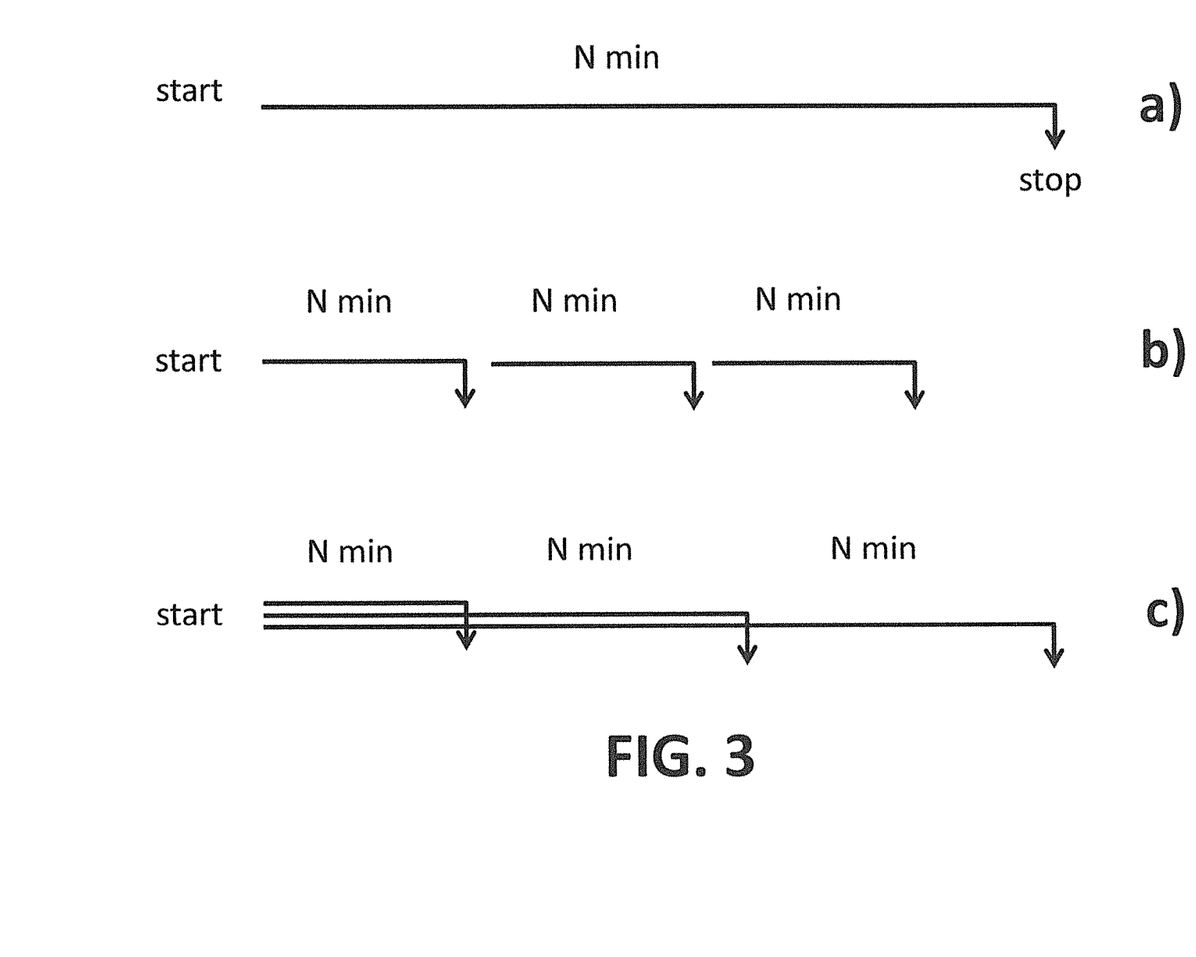
FIG. 3 is illustrative of some possible temporal methods for estimating the vehicle kinematic quantities through the system according to the invention.

System 1 estimates with the above-mentioned methods the numeric absolute value of the vehicle load in a time period having a certain duration. In fact, the determination of the frequency spectrum of the vehicle vertical acceleration ž, in particular of the vertical acceleration filtered in the predetermined frequency bands, requires a detection of the latter for a definite time period. This time period can be selected following different methods, represented, by way of example, in FIG. 3.

According to the first embodiment (FIG. 3*a*), system 1 acquires the vehicle vertical acceleration from a starting instant (Start)—such as for example the start of the vehicle—until a final instant (stop), which can be preset or selected during use. The determination of the ratio index r and, therefore, of the numeric absolute value of the load L, on the basis of the frequency spectrum of the vertical acceleration ž filtered in the two predetermined frequency bands, is calculated based on detections made in this time period.

According to a second embodiment (FIG. 3*b*), the system acquires the vertical acceleration of the vehicle in subsequent distinct time periods. Each of such periods has a start and a stop, and a time duration (N min), during which the vertical acceleration ž, is detected. In each subsequent time period, the acquisition starts from the very beginning, without taking into account the detections made in previous time period. In each time period a ratio index r is therefore determined, independently from the other time periods.

According to a third embodiment (FIG. 3*c*), the system acquires the vehicle vertical acceleration in time periods, having a common starting instant and subsequent distinct final instants. Therefore, the ratio index r, determined at the end of each time period, is also based on detections made in subsequent time periods.

The methods used to determine the first and the second predetermined frequency bands, on which frequency spectra analysis is based, will be now described, as well as the methods used to establish a predetermined relation between the ratio index r and the parameters related to the vehicle load. For the sake of simplicity, the specific case of estimation of the numeric absolute value of the vehicle load L will be considered again. With regard to the numeric value representing the load distribution D, the methods are quite similar, as it will be evidenced.

The determination of the predetermined frequency bands and of the relation between the ratio index r and the load numeric absolute value L can be made before using the system 1, as, for example, in a calibration phase of the latter.

In this calibration phase it is necessary to fix a conventional condition of unloaded vehicle and to make subsequent tests, where a known additional mass is added to the vehicle. In each of these tests, a detection of the vertical acceleration $\ddot{z}$ is made and from this detection the frequency spectrum of the vertical acceleration is determined.

Figure 4:
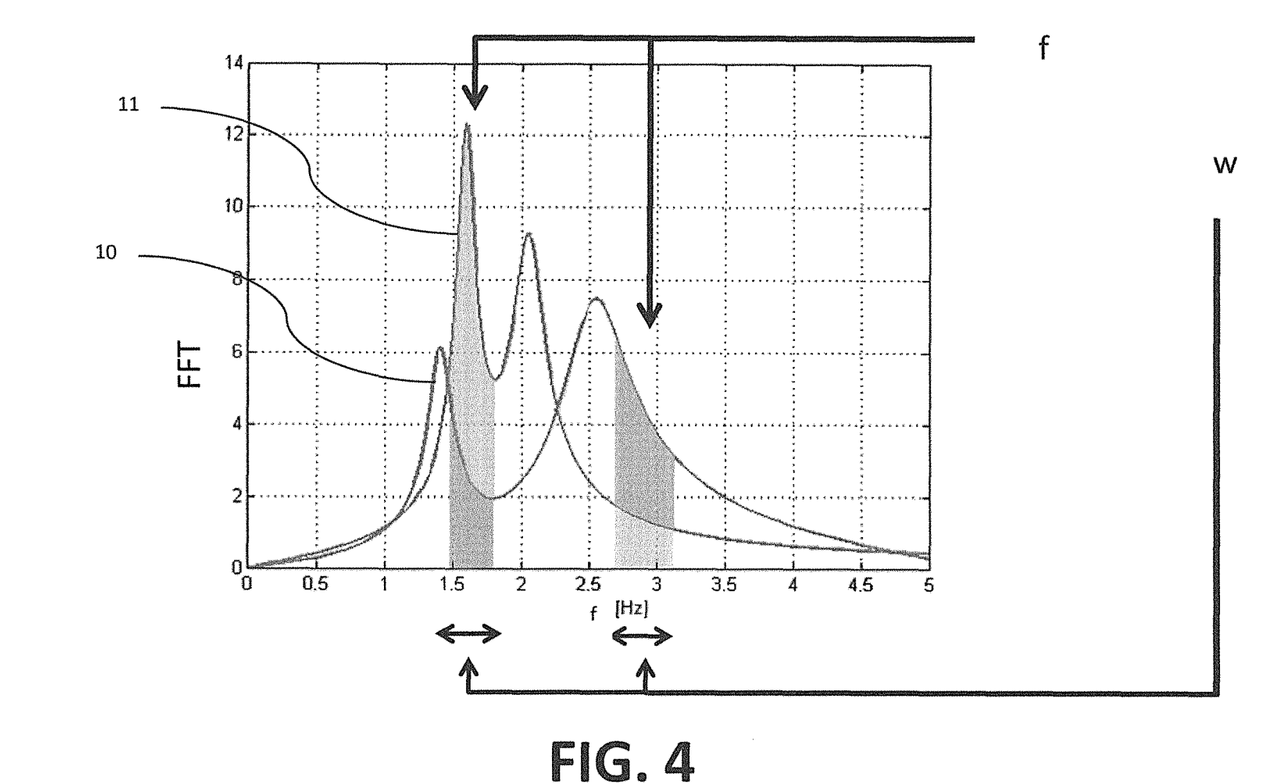
FIG. 4 is a diagram representative of a possible frequency spectrum of the vehicle vertical acceleration in two different load conditions.

FIG. 4 is a diagram of the possible frequency spectra of the vehicle vertical acceleration $\ddot{z}$, in two different conditions of the latter: vehicle unloaded (curve 10) and vehicle loaded with a known additional load (curve 11). For both spectra, integrals have been highlighted in two possible bands, i.e. in the areas subtended by curves 10 and 11 in such two bands.

The determination of the two predefined frequency bands involves selecting, for each band, a center f and a bandwidth w. One possible criterion, for selecting the bands, is to fix two frequency bands, wherein the difference between the spectra integrals in the two conditions of loaded and unloaded vehicle is maximized, or at least high. For example, it's possible to select two reference bands, defined by parameters f and w, in such a way as to maximize a performance index J, expressed through the following function (1):

$$J(f, w) = \int_{f-w/2}^{f+w/2} \frac{|\Gamma_{ya}(\omega) - \Gamma_{yb}(\omega)| df}{w} \quad (1)$$

wherein $\Gamma_{ya}(\omega)$ and $\Gamma_{yb}(\omega)$ represent, respectively, the acceleration spectra in case of loaded and unloaded vehicle at different frequencies ($\omega$).

Figure 5:
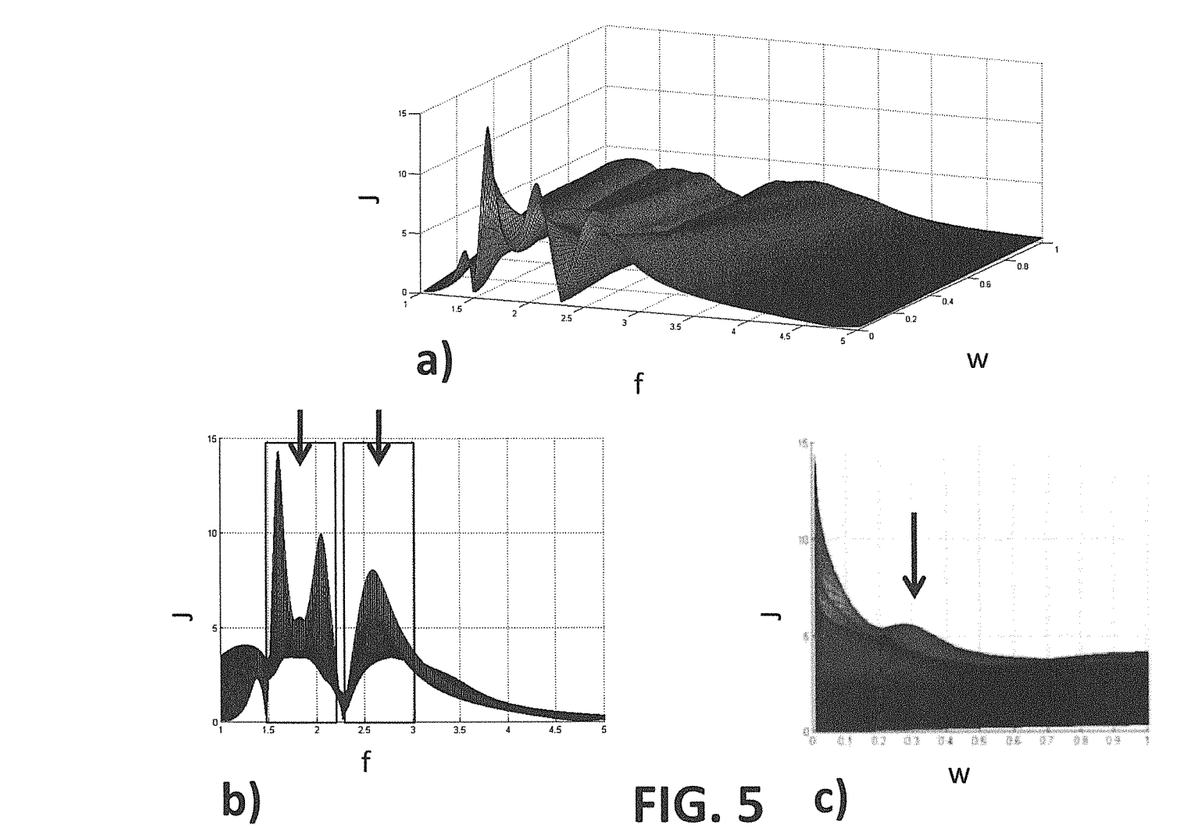
FIG. 5 shows diagrams representative of a performance index J, to be maximized as a function of the frequency band center and amplitude in the spectra in FIG. 4.

A possible graph trend of the function (1), when varying the parameters f and w, is illustrated in FIG. 5a. In FIGS. 5b and 5c, the projections of the three-dimensional curve of FIG. 5a are represented, respectively in case of w constant and in case of f constant. In the diagram in FIG. 5b, three peaks of the performance index J are shown: the frequency f center can then be selected in the highlights, which include said peaks. Similarly, observing FIG. 5c, one single peak is represented, omitting the first peak, which can therefore be selected as a reference value for the bandwidth w to be considered.

Once the first and the second frequency bands to be considered are determined, it is possible to calculate the ratio index r, associated to the frequency spectrum of the loaded vehicle, whose load absolute value L is known, by dividing the integrals of the frequency spectrum, which refers to the loaded vehicle in the first and second bands.

It should be noted that the road profile shape does not substantially affect the frequency spectra obtained through the above-mentioned methods, as it only modifies them by a scaling factor.

Figure 6:
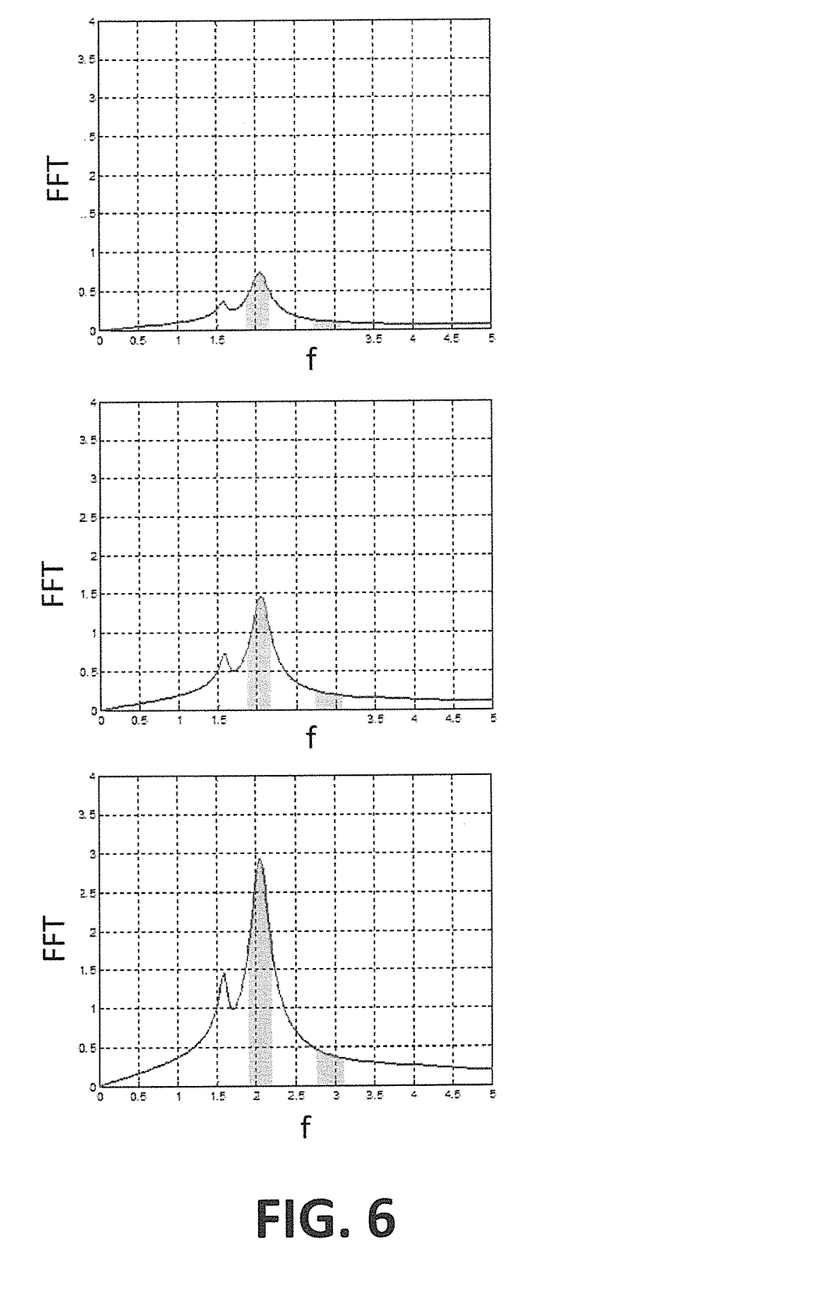
FIG. 6 is a diagram representative of the variation of the frequency spectra of the vertical acceleration of a vehicle, when its speed varies.

Moreover even the vehicle speed affects the frequency spectrum of the vertical acceleration only by a scaling factor for vehicle speeds above a minimum speed. In other words, for each speed the spectrum shows the same trend, just amplified by a different factor. The situation is represented in FIG. 6, which precisely shows the vehicle vertical acceleration spectra, with a same load, at different speeds. As a consequence, the ratio index r, calculated as a division between the integrals of the frequency spectra of the vertical acceleration, filtered in the two predetermined frequency bands, keeps substantially constant as the vehicle speed changes and exceeds said minimum speed.

Therefore, the relation between the ration index r and the load numeric absolute value L, obtained through the previously mentioned methods is not significantly influenced by the vehicle speed, nor by the road surface conformation. There exists then a congruence between the performance indexes, determined during the calibration phase, and those determined during the actual use of the system 1. Note that, according to a possible embodiment, the system comprises means for detecting the vehicle speed, so to enable the calculation of the parameters related to the vehicle load, only in case the vehicle exceeds said minimum speed. For example, system 1 can comprise or be associated to a GPS system.

Repeating said operations for different load values, it is possible to obtain a predetermined relation between the ratio index r and the numeric absolute value of the load L, which is utilized by the system 1 during use and in particular by the comparator module 9, to determine the load absolute value on the basis of the vehicle vertical acceleration detections, from which the ratio indexes can be obtained.

Figure 7:
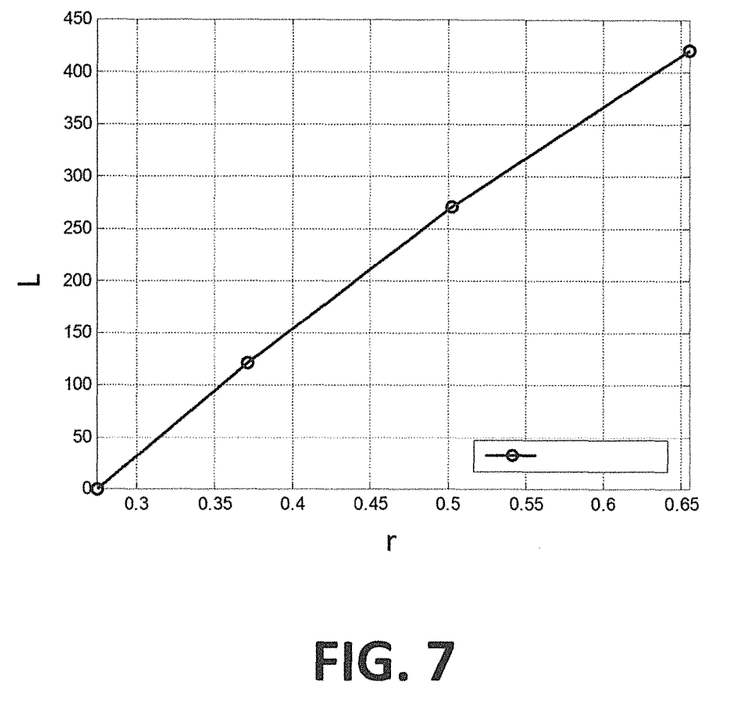
FIG. 7 is a diagram representative of a possible relation between the vehicle load, estimated by the system, and a ratio index.

In FIG. 7 a possible curve represents the relation between the ratio index r and the numeric absolute value of the load L, obtained by interpolation of the actual values determined during system calibration. Of course, it is possible to approximate the actual values through mathematical equations, such as for example:

$$L(r) = a\sqrt{r} + br + c$$

wherein coefficients a, b and c are, for example, are calculated following the criterion of minimizing the mean-squared error between the curve itself and the actual data.

Note that the above-described calibration criterion grants reliable results, i.e. an accurate estimation of the numeric absolute value of the load L, if load positioning during the actual use of the system corresponds to the load positioning adopted during the calibration of the system 1. In case of discrepancy between load positioning in the two situations, the value estimated by the system could be subject to more severe errors. In order to overcome this problem, it is possible to combine information from the vehicle vertical acceleration sensors with more information detected by the pitch speed sensors. This aspect will be considered later.

System 1, according to the embodiment described so far, is able to estimate the numeric absolute value of the vehicle load L.

Figure 8:
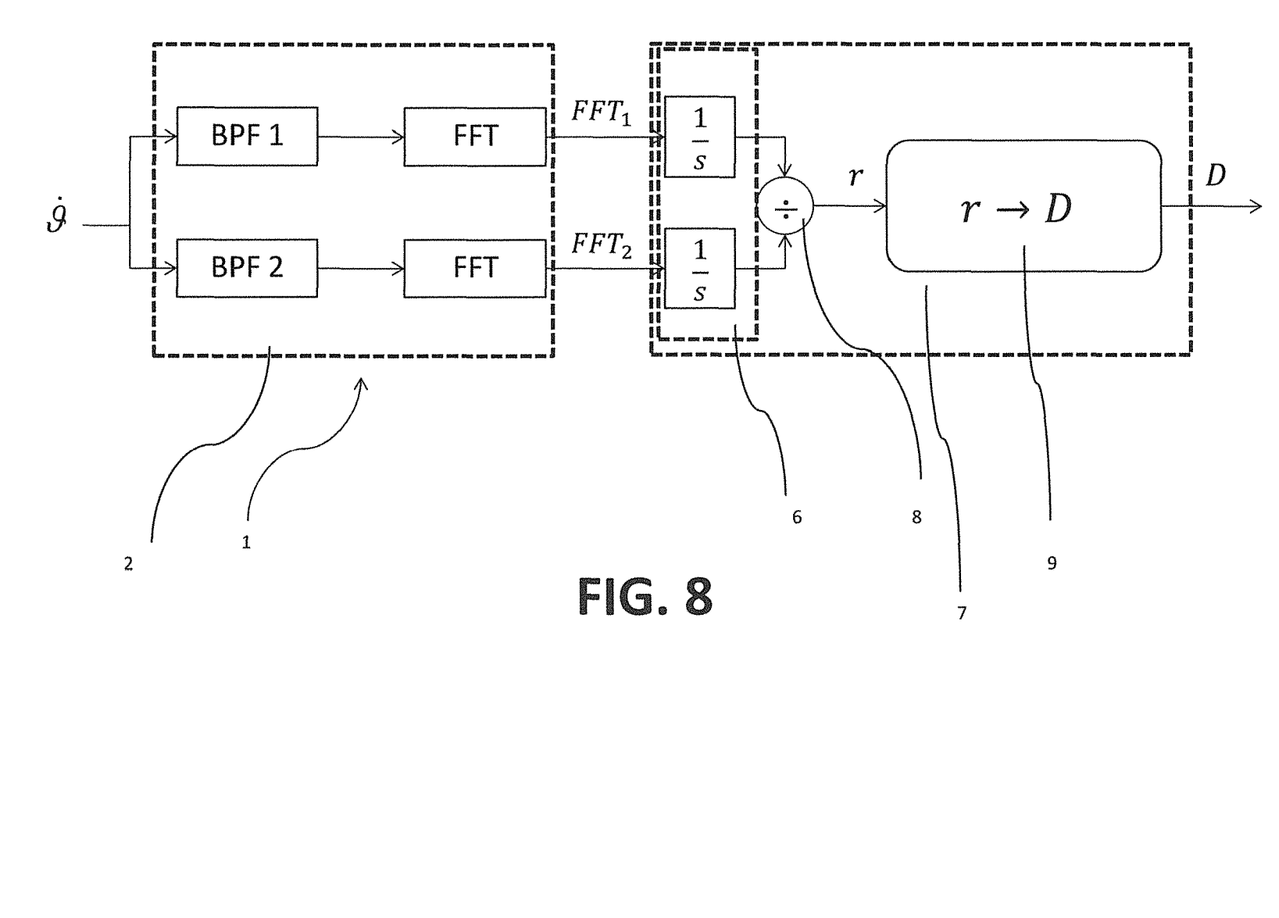
FIG. 8 is a block diagram of a system for the estimation of one or more parameters related to the load of a vehicle according to a further possible embodiment.

According to an alternative embodiment, system 1 is able to estimate a different parameter related to the load, in particular its distribution, preferably expressed by a numeric value representing the load D, previously defined. FIG. 8 is a block diagram of system 1 according to this alternative embodiment. With reference to this embodiment, system 1 comprises a sensor (not shown in the figures) for detecting the vehicle pitch angular speed, named $\dot{\vartheta}$. The pitch angular speed sensor may, for example, comprise a gyroscope. The pitch angular speed sensor is suitable to generate an output signal representing the vehicle pitch angular speed.

Module 2 is configured so to determine the frequency spectrum of the pitch angular speed $\dot{\vartheta}$, following the above-described methods, used for the vertical acceleration. Module 2 for determining the frequency spectrum of the pitch angular speed is in particular configured so to determine the frequency spectrum of the pitch angular speed of the vehicle, filtered in a first and in a second predetermined frequency bands. To this purpose, advantageously, module 2 for determining the frequency spectrum of the pitch angular speed comprises a first BPF1 and a second BPF2 band-pass filters, for filtering the signal representing the pitch angular speed in the first and in the second predetermined frequency bands. In the block diagram of FIG. 8, the frequency spectra of the pitch angular speed, respectively filtered in the first and in the second predetermined frequency bands, are respectively named FFT1 and FFT2. The first and the second predetermined frequency bands are determined in a way similar to the one described for the vertical acceleration predetermined bands.

The integrator module 6 acts on the FFT1 and FFT2 frequency spectra and makes their integration, i.e. calculates the area subtended by the spectra curve of the pitch angular speed, filtered in the two bands.

The division module 8 makes a division between the two integrals, calculated by the integrator module 6, of the FFT1 and FFT2 frequency spectra. The result of such division is a numeric ratio index r, which is univocally associated to the numeric value representing the load distribution D, through a predetermined relation between the latter and the ratio index r.

The determination of the numeric value representing the load distribution D can be carried out by the comparator module 9, which makes a comparison between the ratio index r, determined by the division module 8, and the numeric value representing the load distribution D, which corresponds to this ratio index r on the basis of a predetermined relation established a priori. The methods for determining the predetermined relation between the ratio index r and the numeric value, representing the load distribution, are totally similar to those described for the numeric absolute value of the load L. In particular, in a preliminary calibration phase, the ratio indexes r are determined. They correspond to different load distributions, known through subsequent tests, in which the load is repositioned in the vehicle, and for each load positioning a ratio index r is determined.

The time period, during which the system acquires the signal representing the pitch angular speed $\dot\vartheta$, can be selected in the same ways, as previously described for vertical acceleration, as illustrated in FIG. 4.

System 1, according to the embodiments described so far, is able to estimate the numeric absolute value of the vehicle load L or, alternatively, the numeric value D, representing the load distribution. Of course, system 1 may be alternatively configured so to estimate both parameters.

Figure 9:
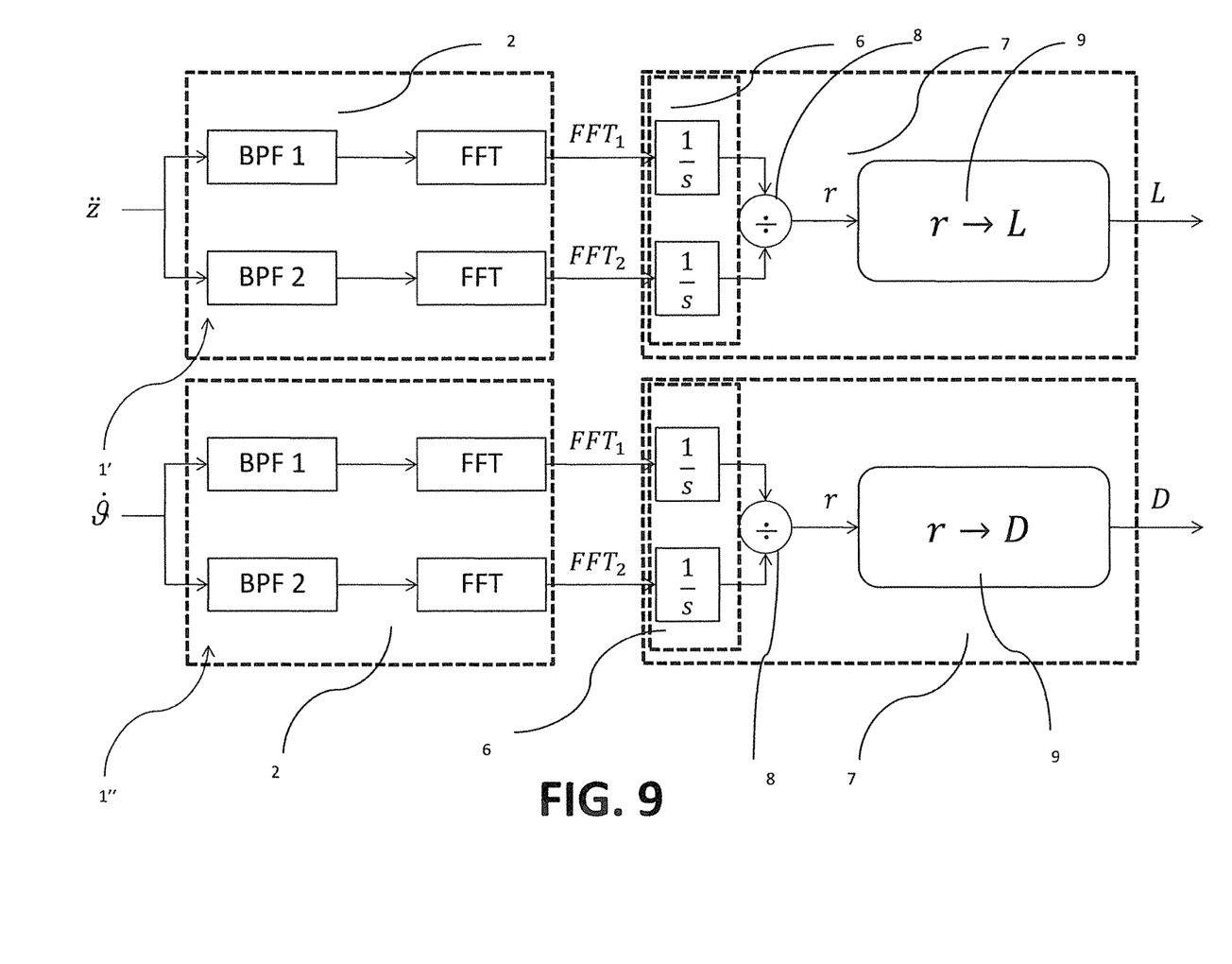
FIG. 9 is a block diagram of a system for the estimation of one or more parameters related to the load of a vehicle according to a further possible embodiment.

To this purpose, system 1 may comprise a first system 1', able to estimate the numeric absolute value of the vehicle load L, (similar to the system described with reference to FIG. 1) and a second system 1", able to estimate the numeric value D representing the load distribution, (similar to the system described with reference to FIG. 8). The first 1' and second 1" systems can be each configured as previously explained and can be calibrated in the aforesaid ways. Such configuration is schematically shown in FIG. 9.

Figure 10:
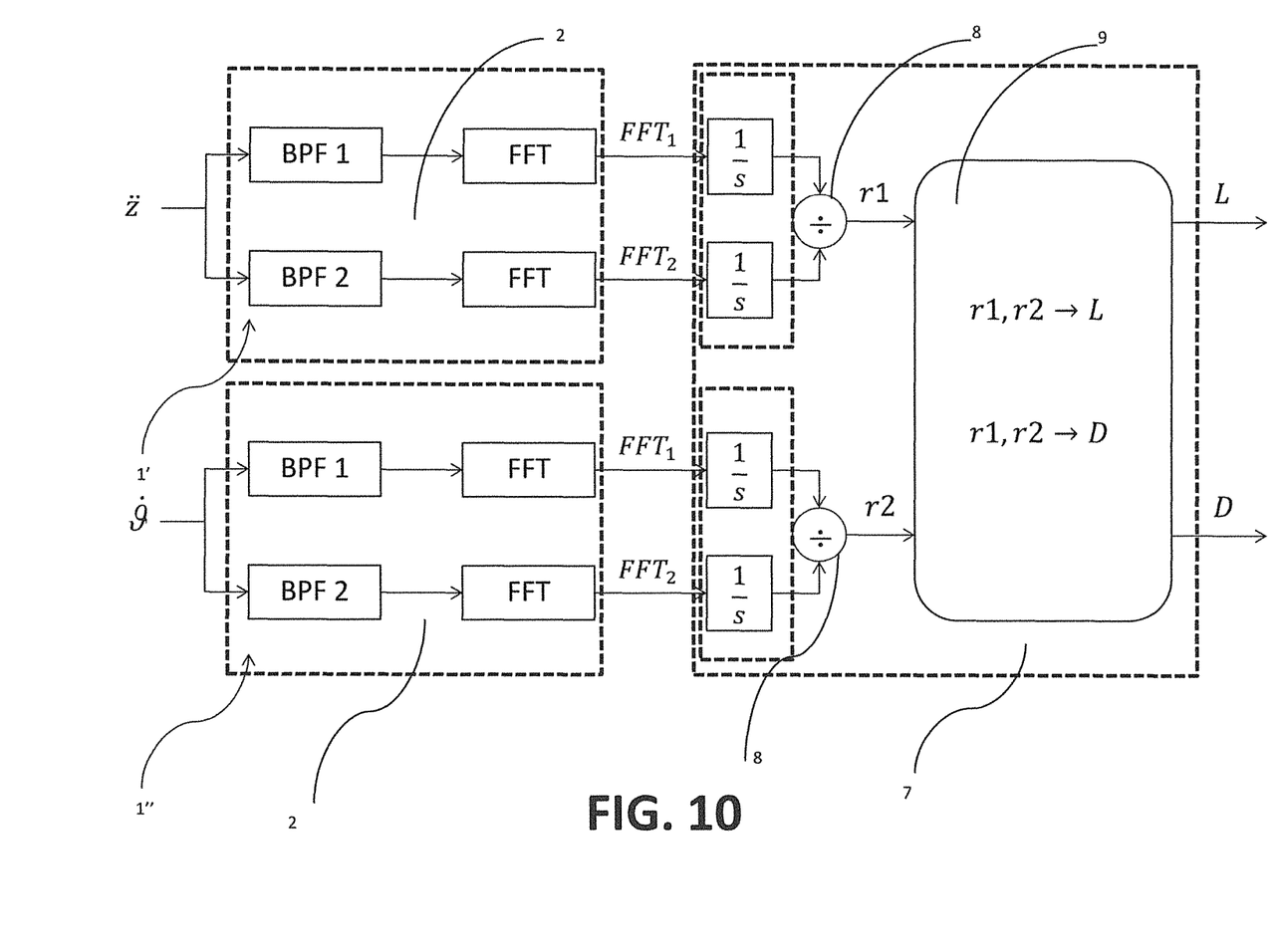
FIG. 10 is a block diagram of a system for the estimation of one or more parameters related to the load of a vehicle according to a further possible embodiment.

According to a further possible embodiment, the first 1' and the second 1" systems are integrated together and provide output results, each correlated to its own detections and to those made by the other system. This further embodiment is schematically illustrated in FIG. 10. Compared to the embodiment illustrated in FIG. 9, the comparator module 9 is common both to the first 1') and to the second 1" systems. Each determines, in the aforesaid ways, a first r1 and a second r2 ratio indexes. The predetermined relation between the parameters, related to the vehicle load, and the ratio indexes is, however, more complex, since to each pair numeric absolute value of the load L)—numeric value representing the load distribution D corresponds a pair first ratio index r1)(related to the vertical acceleration)—second ratio index r2 (related to the pitch angular acceleration). This complex relation can be determined during the calibration of the system in the following way.

An additional load is imposed to the vehicle in a first position (using the unloaded vehicle as baseline). Following the methods previously described for the first 1' and second 1" system, the first r1 and the second r2 ratio indexes are respectively determined. The same load (i.e. a load with the same absolute value) is then moved in different positions: for each, following the previously-described methods, the first r1 and the second r2 ratio indexes are determined. Then the load is changed (i.e. its absolute value is changed) and again, for each position, the first r1 and the second r2 ratio indexes are determined, following the previously-described methods. Thus the desired predetermined relation, that connects L, D, r1 and r2, is finally determined. The discrete data, obtained through the aforesaid methods, can then be approximated, for example by means of mathematical equations such as:

$$\begin{cases} L = ar_1 + b\sqrt{r_1} + cr_2 + d\sqrt{r_2} + e \\ D = fr_1 + g\sqrt{r_1} + hr_2 + i\sqrt{r_2} + l \end{cases}$$

where a, b, c, d, e, f, g, h, i, l are numeric parameters determined, for example, so as to minimize the error between the actual and approximate data. It is clear that the numeric absolute value of the load L and the numeric value representing the load distribution D depend each both on the first r1 and on the second r2 ratio indexes.

It has been verified that the system, so configured, allows to reduce the error in estimating the numeric absolute value of the load L, which can occur in case the load, during the use of the system, is not in the same position as in the calibration phase, according to what previously stated.

Figure 11:
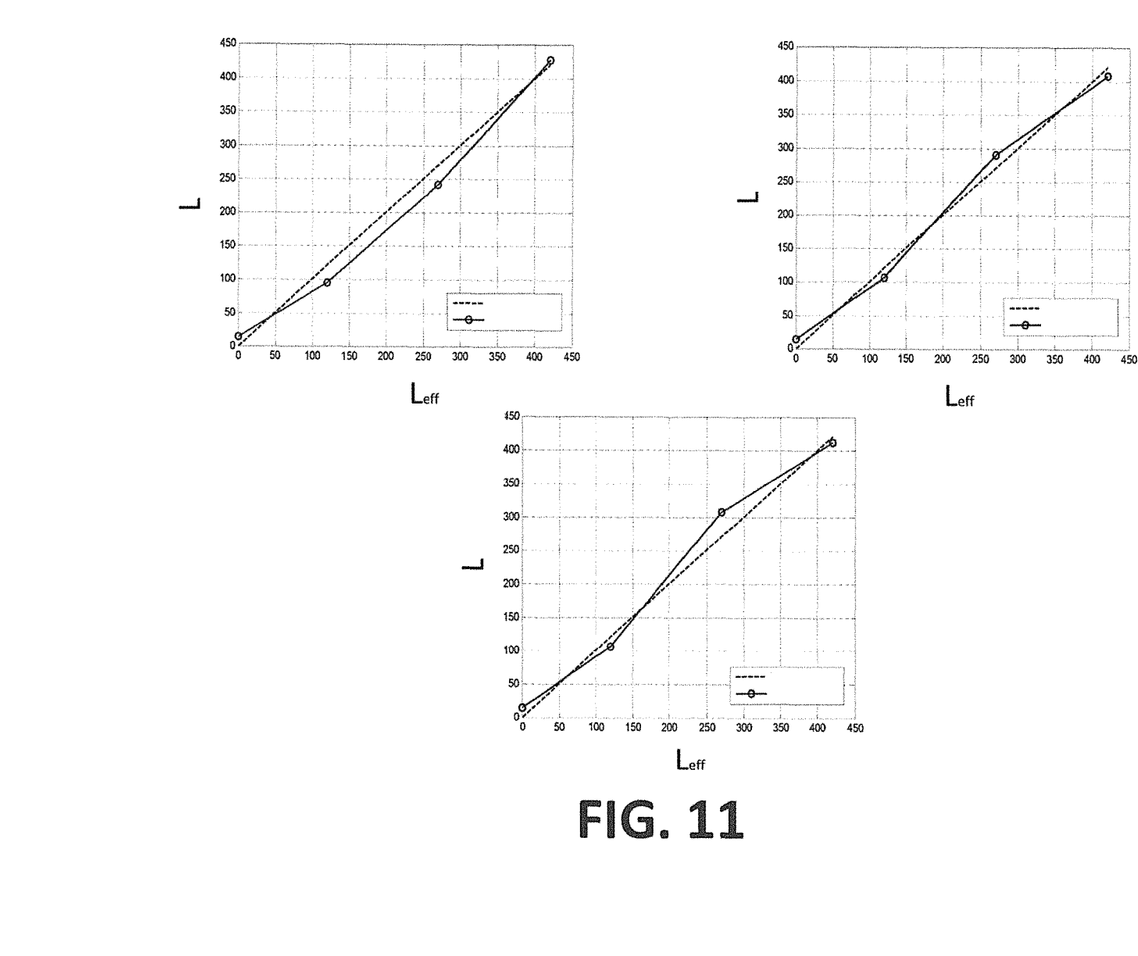
FIG. 11 shows diagrams illustrative of the estimation of the load absolute value, carried out by the system and compared to the actual load for three different load positions in a vehicle.

FIG. 11 shows three diagrams, wherein the actual load values Leff are compared to the estimated load values L for three different load distributions. In particular, these situations are illustrated in the following order: load concentrated on the front, load concentrated in the middle, load concentrated on the rear of the vehicle. It is evident that the error in estimating the numeric absolute value of the load L (dashed line), compared to the perfect estimation (i.e., the condition L=Leff, solid line) remains limited, when varying the actual load Leff.

Figure 12:
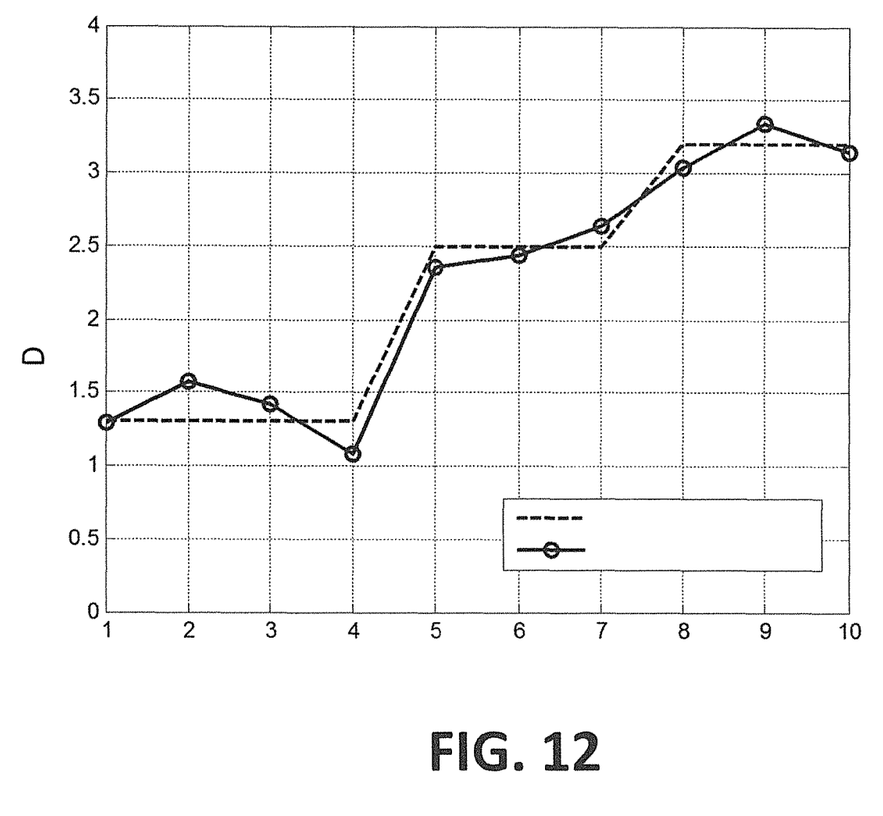
FIG. 12 shows a diagram illustrative of the estimation of the load distribution, carried out by the system and compared to the actual distribution for three different load positions in a vehicle.

Finally FIG. 12 is a diagram, illustrating a comparison between the actual load distribution (dashed line) and the load distribution D estimated by system 1 solid line, in three different load distribution conditions and through several tests. In particular, these situations are illustrated in the following order: load concentrated on the front (4 tests), load concentrated in the middle (3 tests), load concentrated on the rear of the vehicle (3 tests). It is clear that, even in this case, the error in estimating the numeric value, representing the load distribution D, remains limited.

Note that, although in the present description the vertical acceleration $\ddot z$ and the angular speed $\dot\vartheta$ of the vehicle are referenced as input kinematic quantities to the system 1, it is alternatively possible to use in a similar manner different kinematic quantities, which will require a dedicated calibration. The term "kinematic quantities" means linear or angular displacement, speed and acceleration.

Note also that, in the present description and in the appended claims, system 1 as well as the elements named "module" may be implemented using hardware devices (e.g. control units), software or a combination of hardware and software.

From the above description, the skilled person will appreciate that the system, according the invention, is able to estimate, with a limited error, the absolute value of the load and/or its distribution in a vehicle, based on detections made by simple inertial sensors, which can be limited to a maximum number equal to two, such as, for example, an accelerometer and a gyroscope. The system, as well as the sensors, can be installed in any position in the vehicle, preferably in its body. System 1 is thus low cost and easy to install.

The skilled person will also appreciate how system 1 may be used as first equipment on any vehicle model. In fact, if the calibration is just carried out on a single vehicle, the system can be applied without further specific calibration on other vehicles of the same model. Even the calibration activity is therefore altogether moderate-priced in case of mass-produced vehicles.

The skilled person, in order to satisfy specific contingent needs, may change the embodiments described so far, making several additions, modifications or replacements of elements with other functionally equivalent, without however departing from the scope of the appended claims.

The invention claimed is:

1. A system for the estimation of parameters (L, D) related to a load of a vehicle, said system comprising:
    first and second sensors for detecting respective first and second vehicle kinematic quantities, each sensor being suitable to generate signals representing the respective one of said vehicle kinematic quantities;
    a control unit comprising:
        first and second pairs of band-pass filters, each pair comprising first and second band-pass filters;
        one or more modules for determining frequency spectra pairs (FFT1, FFT2), a frequency spectra pair being associated with each of said first and second vehicle kinematic quantities, from the signals representing the respective vehicle kinematic quantity filtered in a first and in a second predetermined frequency band through the first and second band-pass filters of a respective pair of the band-pass filters; and
        one or more modules for determining a numeric value representing the vehicle load (L) in kilograms and a numeric value representing the load distribution (D) in the vehicle from said frequency spectra pairs (FFT1, FFT2),
    wherein said numeric value representing the load distribution in the vehicle (D) represents the longitudinal distance of the concentrated load of the vehicle from a predetermined reference point,
    wherein said numeric value representing the vehicle load (L) is a numeric absolute value representing the vehicle load (L), and said sensors comprise a sensor configured for detecting the vehicle vertical acceleration ($\ddot{z}$) and for generating a signal representing the vehicle vertical acceleration, and a sensor configured for detecting the vehicle pitch angular speed ($\dot{\vartheta}$) and for generating a signal representing the vehicle pitch angular speed,
    whereby the determination of said numeric value representing the vehicle load (L) and of said numeric value representing the load distribution in the vehicle (D) enables improvement in a stability of the vehicle.

2. The system according to claim 1, wherein said first and second predetermined frequency bands are determined by comparing a first and a second frequency spectra which are associated to the signal representing the respective vehicle kinematic quantity for a first and a second value of the latter, and selecting two frequency bands in which the difference between the integrals of said first and second spectra are maximized.

3. The system according to claim 1, wherein said one or more modules for determining the parameters (L, D) related to the load of the vehicle comprise an integrator module configured so to determine a first and a second integrals of each spectrum of said frequency spectra pairs (FFT1, FFT2), respectively.

4. The system according to claim 1, wherein said frequency spectra pairs are determined on the basis of the acquisition of the one or more kinematic quantities of the vehicle ($\ddot{z}$, $\dot{\vartheta}$) alternatively:
    from a starting instant until a final instant;
    in subsequent distinct time periods;
    in subsequent time periods having a common starting instant and subsequent distinct final instants.

5. The system according to claim 3, wherein said one or more modules for determining the parameters (L, D) related to the load of the vehicle comprise a division module configured so to determine a ratio index (r; r1, r2) by dividing said first integral by said second integral of each spectrum of said frequency spectra pairs (FFT1, FFT2).

6. The system according to claim 5, wherein said one or more modules for determining the parameters (L, D) related to the load of the vehicle comprise a comparator module configured so to determine said parameters (L, D) related to the load of the vehicle from one or more of said ratio indexes (r; r1, r2) on the basis of a predetermined relation between said parameters (L, D) related to the load of the vehicle and said one or more ratio indexes (r; r1, r2).

7. The system according to claim 6, wherein said predetermined relation correlates the vehicle load absolute value with a ratio index (r) associated to the vehicle load absolute value, said predetermined relation being determined a priori through the system by determining said ratio index (r) associated to the vehicle load absolute value following an imposition to the vehicle of loads having known different absolute values.

8. A vehicle comprising:
    a system for the estimation of parameters (L, D) related to a load of a vehicle, said system comprising:
        first and second sensors for detecting respective first and second vehicle kinematic quantities, each sensor being suitable to generate signals representing the respective one of said vehicle kinematic quantities;
        a control unit comprising:
            first and second pairs of band-pass filters, each pair comprising first and second band-pass filters;
            one or more modules for determining frequency spectra pairs (FFT1,FFT2), a frequency spectra pair being associated with each of said first and second vehicle kinematic quantities, from the signals representing the respective vehicle kinematic quantity filtered in a first and in a second predetermined frequency band through the first and second band-pass filters of a respective pair of the band-pass filters; and
            one or more modules for determining a numeric value representing the vehicle load (L) in kilograms and a numeric value representing the load distribution (D) in the vehicle from said frequency spectra pairs (FFT1, FFT2),
        wherein said numeric value representing the load distribution in the vehicle (D) represents the longitudinal distance of the concentrated load of the vehicle from a predetermined reference point, wherein said numeric value representing the vehicle load (L) is a numeric absolute value representing the vehicle load (L), and said sensors comprise a sensor configured for detecting the vehicle vertical acceleration ($\ddot{z}$) and for generating a signal representing the vehicle vertical acceleration, and a sensor configured for detecting the vehicle pitch angular speed ($\dot{\vartheta}$) and for generating a signal representing the vehicle pitch angular speed, whereby the determination of said numeric value representing the vehicle load (L) and of said numeric value representing the load distribution in the vehicle (D) enables improvement in a stability of the vehicle.

\* \* \* \* \*